United States Patent [19]

Kägi

[11] Patent Number: 5,205,202
[45] Date of Patent: Apr. 27, 1993

[54] COMPRESSED AIR RADIAL MOTOR

[75] Inventor: René Kägi, Stäfa, Switzerland

[73] Assignees: Peter Richner, Hagglingen; Gerold Richner, Wohlen; Bruno Paul Wernli, Habsburg; Riwisa AG Kunststoffwerke, Hagglingen, all of Switzerland

[21] Appl. No.: 748,656

[22] Filed: Aug. 22, 1991

[30] Foreign Application Priority Data

Aug. 23, 1990 [CH] Switzerland .................... 02739/90

[51] Int. Cl.$^5$ .......................... F01B 3/06; F01B 19/00
[52] U.S. Cl. ...................................... 91/485; 91/499; 92/48
[58] Field of Search ............ 417/269, 437, 312; 91/484, 485, 472, 499; 92/99 R, 99, 48

[56] References Cited

U.S. PATENT DOCUMENTS

| | | | |
|---|---|---|---|
| 4,072,210 | 2/1978 | Chien | 417/534 |
| 5,018,435 | 5/1991 | Kagi | 91/499 |

FOREIGN PATENT DOCUMENTS 584857 2/1977 Switzerland .......................... 91/485

Primary Examiner—Richard A. Bertsch
Assistant Examiner—Roland McAndrews
Attorney, Agent, or Firm—Herbert Dubno; Yuri Kateshou

[57] ABSTRACT

The compressed air radial motor includes a supporting disc, supporting a plurality of fluid cells, which is pneumatically controlled by a control head disposed rotatably fixed in the motor housing and which is rotatably connected to a conical supporting disc supported on the motor shaft via the fluid cells, a diaphragm being disposed at the outer front side of the control head which, on the inner side, is under the flow pressure of the pressure medium flowing through the driving-side of the control head, and, on the other side, supports the control head against the supporting disc via a counter surface in the motor housing.

3 Claims, 1 Drawing Sheet

COMPRESSED AIR RADIAL MOTOR

FIELD OF THE INVENTION

The present invention relates to a compressed air radial motor comprising a supporting disc, supporting a plurality of fluid cells, which is pneumatically controlled by means of a control head disposed rotatably fixed in the motor housing and which is rotatably connected to a conical supporting disc, supported on the motor shaft, via the fluid cells.

BACKGROUND OF THE INVENTION

Problematic with such compressed air radial motors is, among other things, the requirement of a sealing contact which seals as tightly as possible between the standing-still contact surface of the control head and the rotating contact surface of the supporting disc in order to avoid pressure loss of the pressure medium, which is diametrically opposed to a low-frictional performance to avoid torsional losses.

Attempts to press the control head onto the support disc by means of spring means or, for instance, in accordance with CH Patent No. 584,857 using bellows means failed not only because of the necessary technical resources but in particular because of the completely insufficient torque, particularly at low rotational speed, as a result of the friction load between the contact surfaces of the rotatably-fixed control head and the rotating support disc.

OBJECTS OF THE INVENTION

Therefore, a primary object of the present invention is to provide a compressed air radial motor which ensures an operational performance which is free from losses of compressed air as well as always ensuring an optimum torque at every rotational speed with least technical resources.

This is achieved according to the invention by mounting a pressure disc on the outer front side of the control head so as, on the inner side, under the flow pressure of the pressure medium flowing through the driving-side of the control head, and supports on the outer side the control head against the supporting disc via a counter surface in the motor housing.

This pressure disc can be developed piston-like or be a diaphragm.

In this connection, an advantageous embodiment of the compressed air radial motor according to the invention consists in the fact that the diaphragm is a round, rubber-elastic disc that sits in an annular slot face-side of the control head and forms a face-side wall for the pressure chamber in the control head; or otherwise the diaphragm is formed by partial attenuation of the outer face side of the control head and defines on the inner side a pressure chamber in the control head.

It is moreover an advantage that the diaphragm possesses a linear characteristic at least in the effective area of stroke thereof.

Furthermore, in order to render an optimum sound absorbtion on such a compressed air radial motor possible without extensive technical resources, it is an additional advantage that an annular chamber exists between the shell of the control head and the housing section surrounding this head, which is at least partially formed with a sound-adsorbing, air-porous material.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
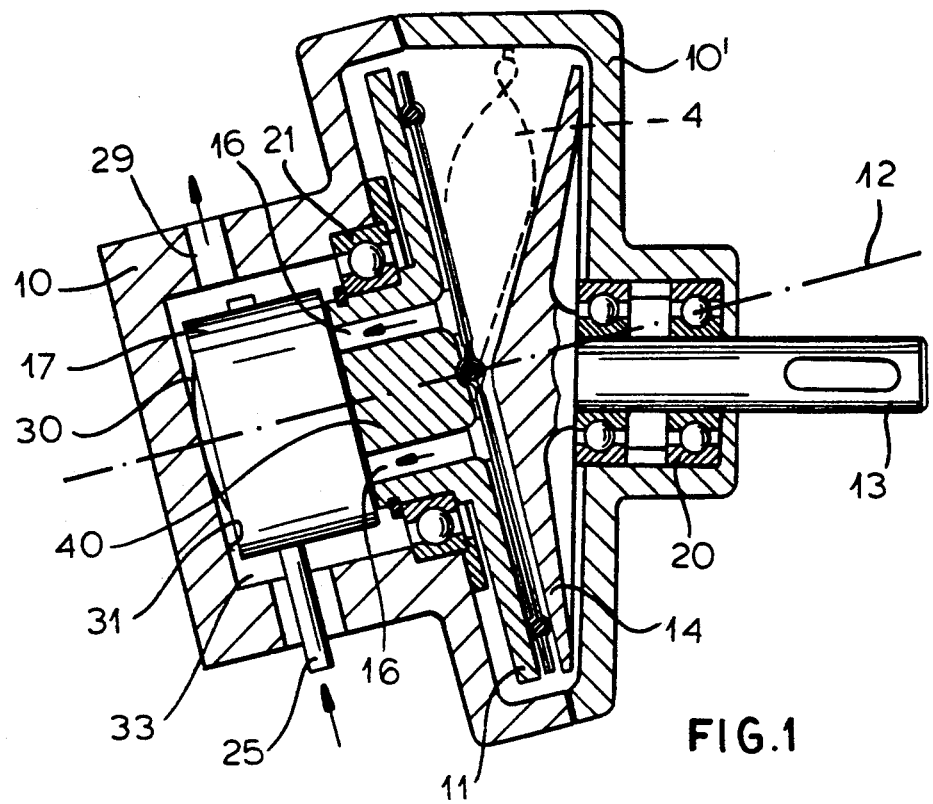
FIG. 1 is a diagrammatic sectional view of a compressed air radial motor according to the invention.

As FIG. 1 diagrammatically illustrates, the compressed air radial motor comprises two housing sections 10, 10', which as a rule may be easily separated from each other, in the chamber of which a rotating, flat supporting disc 11 extends, the axis of rotation 12 thereof forming, with a driving shaft 13, a corresponding angle of the conicalness of a conical supporting disc 14 connected to the driving shaft 13.

A fluid cell arrangement having a plurality of fluid cells is supported on the flat supporting disc 11, which is in form-locking torque driving connection with the flat supporting disc 11, and the cells 4 thereof being in flow connection via appropriate connecting boreholes 16 in the supporting disc 11 and/or the rotational hub 40 thereof with a control head 17 and with a pressure source (not shown in detail). Furthermore, the fluid cell arrangement is in operative connection to the conical supporting disc 14.

The operating characteristics of such compressed air radial motors are known. In order to put the motor into operation, pressure medium, for instance compressed air, is supplied through the control head 17. The pressure medium enters the fluid cell which has been momentarily selected and which has increased in volume. In this way, in consequence of the described arrangement of the two supporting disc 11 and 14, there results a torque on the conical supporting disc 14, which is proportional to the pressure. As a consequence, the conical supporting disc 14 rotates together with the flat supporting disc 11. Accordingly, the supporting disc 14 and the driving shaft 13 are supported by bearings 20, and the supporting disc 11 and the rotational hub 40 are supported by bearings 21 on the motor housing 10, 10'.

Figure 2:
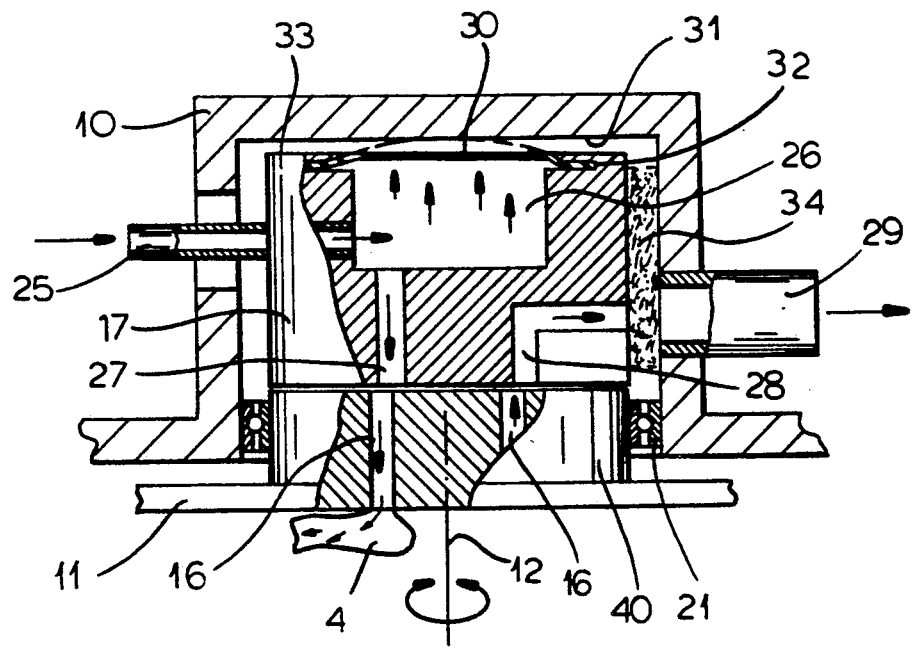
FIG. 2 is a diagrammatic sectional view of the control-head side of the compressed air radial motor on an enlarged scale according to FIG. 1.

As FIG. 2 further shows in detail, the pressure medium enters, via an inlet passage 25, the rotationally-fixed control head 17 or the pressure chamber 26 thereof in the motor housing 10, 10' and from there into an inlet passage 27 which is generally radially oblong-hole shaped and which temporarily communicates with the rotating connecting bore-hole 16, by the face surface of the rotational hub 40 and the control head 17 being in frictional contact and lying against each other to seal as much as is possible.

Further, an outlet passage 28 developed in the same oblong-hole shape as the inlet passage 27 is constructed in the control head 17, which opens via an outlet stack 29 on the housing section 10 and which comes into flow connection with the rotating connecting borehole 16 alternately to the inlet passage 27.

Thus far, the development of the control head member of a compressed air radial motor can be presupposed as known.

As mentioned previously, the problem here consists in the requirement for a frictional contact, sealing as tightly as possible between the standing-still contact surface of the control head 17 and the rotating contact surface of the rotational hub 40.

This problem is solved here according to the invention by a diaphragm 30 disposed at the outer front side of the control head 17, which, on the inner side, is under the flow pressure of the pressure medium flowing through the driving-side of the control head 17, and, on the outer side, supports the control head 17 against the supporting disc 11 via a counter surface 31 in the motor housing 10. For this, the diaphragm 30 forms a face-side wall for the pressure chamber 26 in the control head 17.

Advantageously, the diaphragm 30 is of round surface area and made from a rubber-elastic material and is inserted in an annular slot 32 in the face side of the control head 17.

There also exists, however, the possibility of forming the diaphragm of removing material according from the face surface of the pressure chamber 26 or an appropriate area of the outer face surface of the control head 17.

In a pressureless condition, a slight air gap exists between the diaphragm 30 released of pressure and the counter surface 31 of the housing, and the two contact surfaces of the control head 17 and the rotational hub 40 lie against each other practically without pressure, which permits the driving shaft 17 of the air pressure radial motor to be rotated practically by hand.

On the other hand, with the supply of compressed air, the diaphragm 30 is arcuated outwardly pressure-responsive, and presses thereby the control head 17 against the rotational hub 40. As a consequence, the two contact surfaces of the control head 17 and the rotational hub 40 lie against each other, sealing with a pressure dependent on the control pressure of the pressure medium, yet with slightest friction.

This proportional impingement of the control head 17 for the contact on the rotational hub 40 for a speed or torque regulation variable control pressure of the pressure medium, brings about an automatic sealing between said contact surfaces in operation with minimum friction between them. As a consequence, an optimum torque is attainable at every rotational speed. In this connection, it is essential for the optimization of the functioning of the diaphragm that this possesses a linear characteristic at least within the functional scope thereof.

If the linearity cannot be attained using simple technical means, or the quasi-linear operating manner is not sufficient for specific applications, then the pressure regulating could also be taken over by a sealed, axially-movable, bulb-shaped pressure disc (not shown).

A further problem with such compressed air radial motors consists in absorbing operating noise, for which purpose, means for attenuating sound are generally screwed onto the outlet stack 29.

In order to construct this more effectively, according to the invention an annular chamber 33 is constructed between the control head 17 and the housing section 10 surrounding this, which is partially or extensively permeated with sound-absorbing, air-porous material 34.

Through these features, a compressed air radial motor of the afore-described kind now results which distinguishes itself by a high torque and low-noise operating.

While there are shown and described preferred embodiments of the invention, it is to be distinctly understood that the invention is not limited thereto but may be embodied and practised within the scope of the following claims. ACCORDINGLY,

What I claim is:

1. A compressed air radial motor comprising:
    a housing formed with a wall;
    a motor shaft rotatably mounted on said housing opposite said wall;
    a conical supporting disc rotatably fixed with said shaft in said housing;
    a flat supporting disc mounted rotatably in said housing and facing said supporting disc;
    fluid cell means between said discs for transmitting a torque to said motor shaft;
    a control head for pneumatically controlling said fluid cell means and mounted rotatably fixed in said housing, said control head being formed with:
        an inner face facing said flat disc,
        an outer face spaced from and facing said wall of said housing and provided with an annular groove, and
        a chamber extending axially inwardly from said annular groove;
    means for delivering a pressure medium into said chamber; and
    a pressure round elastomer diaphragm, said diaphragm being a disc received in said groove and spanning said chamber, said diaphragm urging against said wall of said housing under a pressure generated by said medium upon delivering thereof into said chamber and pressing thereby said inner face of said control head against said flat disc.

2. The motor defined in claim 1, wherein said outer face of said control head is provided with an annular flange, said flange being formed with a respective inner side forming said groove with said outer face of said head.

3. The motor defined in claim 1 wherein said control head and said housing form a compartment therebetween, said compartment being at least partially filled with a sound absorbing, air-porous material.

* * * * *